E. SCHRÖDER.
METHOD OF WELDING ELECTRICALLY SHEET ZINC LAP SEAMS.
APPLICATION FILED JAN. 13, 1917.
1,369,360.
Patented Feb. 22, 1921.
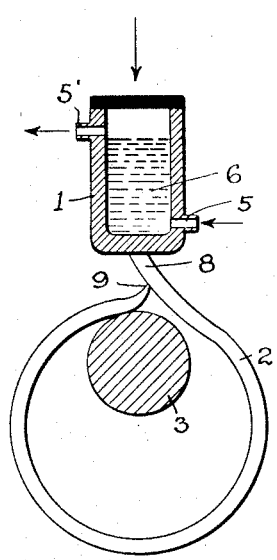
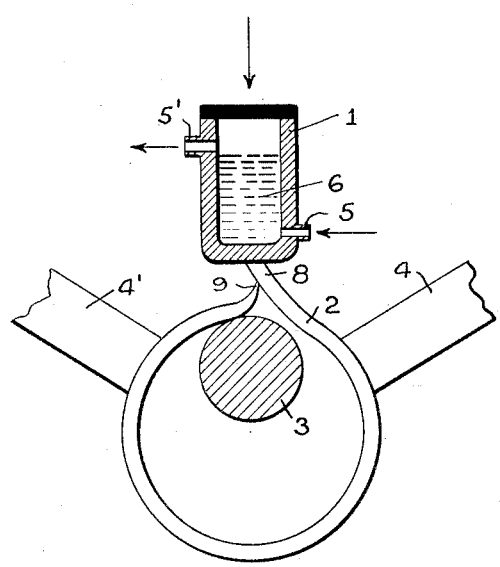

UNITED STATES PATENT OFFICE.

EDMUND SCHRÖDER, OF BERLIN, GERMANY, ASSIGNOR, BY MESNE ASSIGNMENTS, TO THE CHEMICAL FOUNDATION, INC., A CORPORATION OF DELAWARE.

METHOD OF WELDING ELECTRICALLY SHEET-ZINC LAP-SEAMS.

1,369,360.  Specification of Letters Patent.  Patented Feb. 22, 1921.

Application filed January 13, 1917. Serial No. 142,234.

*To all whom it may concern:*

Be it known that I, EDMUND SCHRÖDER, a subject of the German Emperor, and resident of Berlin, in the German Empire, have invented a certain new and Improved Method of Welding Electrically Sheet-Zinc Lap-Seams, of which the following is a specification.

Tight and continuous seams between sheet metal and sheet metal parts are attained, as is known, by the electric resistance welding process, in which the overlapping parts to be united are led through, under appropriate pressure, between two rolls acting as electrodes. In some cases, only one of the electrodes is formed by a roll, for instance, if tubes of comparatively small diameter are to be welded, the inner electrode then consists of a mandrel, which, together with the tube, is passed along below the outer electrode.

When welding sheet-iron parts, for instance, the manner in which the electrodes act upon the overlapping parts is of no particular influence upon the welding process, provided, the overlapping parts themselves are passed between the electrodes. Furthermore the breadth of these parts does not affect the procedure.

If one attempts, however, to unite sheet-zinc parts by the seam welding process, in question, obtaining a proper union is a matter of chance. The consumption of electrical energy is generally great and the electrodes become very hot. The zinc has a solvent action upon the hot electrodes and as both materials then tend to coalesce, welding soon becomes entirely impossible.

The great consumption of electrical energy is chiefly a consequence of the comparatively high conductivity of the zinc, while the rather solid layer of oxid covering the surface of the zinc impedes the welding.

The above-mentioned drawbacks are overcome in my improved method, first, by decreasing the consumption of electrical energy, second, by removing the deleterious layer of oxid from the place of welding; and in particular by the means and steps hereinafter described.

In the accompanying drawing there is set forth, diagrammatically, several illustrative arrangements embodying my invention, by means of which the method may be performed and therein, Figure 1 is a side elevation of one such arrangement, and Fig. 2 is a side elevation of a modification.

In carrying my invention into effect, I make the seam to be welded pass between the electrodes 1 and 3 in such a position that one of the cutting edges 8 of metallic body 2 is always in immediate contact with that zone of one of the electrodes 1, at which the electrical current is supplied, so that the welding is effected chiefly at only one of the cutting edges. Owing to this means, the path of the current at the welding place is narrowed whereby the consumption of current is reduced; and the sharp cutting edge 9 is pressed like a wedge or knife into the surface covering it. The layer of oxid present at the cutting edge is torn or cleaved and when the metal softens the oxid is forced away so that the metal welds under the effect of the electrode pressure.

If desired or necessary, the other cutting edge may be similarly welded, and it is possible to weld both edges at the same time, or the overlapping edges of the sheet zinc parts may be welded at the same time throughout their whole breadth if the distance between the cutting edges, or the breadth of the overlapping parts respectively, is such, *i. e.*, so limited, that practically the two edges fall into one and the same current-conducting zone between the electrodes. The above-described effect produced by narrowing the path of the current, and the wedge-like or knife-like effect, *i. e.*, the cleaving effect, upon the layer of oxid that impedes the welding are then obtained at both cutting edges at the same time, or these effects extend from the one edge over the overlapping parts to the other edge.

Welding at only one of the cutting edges is, as a rule, not intended, and it occurs rather infrequently when welding sheet iron; and further the employment of so small a lap as just mentioned, viz., with the intention to prevent, by means of the electrode pressure, a thickening of the lap-forming edges, is not actually intended; however, these forms of execution lie within the scope of my invention by which it is rendered possible to carry through in a practicable employable manner the electric welding of sheet zinc lap seams.

To facilitate the practical operation of the method, I prefer to cool the electrodes by immediate contact with a cooling medium, and reduce thereby their temperature to a point which is below the fusing point of the metal to be welded. By this means I prevent the electrodes, during uninterrupted work, from adhering to the metal.

Cooled welding electrodes have been utilized, but the recognition of the fact that by cooling the electrode surfaces by immediate contact with a cooling medium easily fusible metals may be readily welded is novel.

The cooling of the electrodes may be effected by introducing an appropriate cooling medium 6 into a suitably hollowed-out electrode 1. The cooling medium enters the electrode at 5 and leaves it at 5' thus coming into direct contact with the working surfaces of the electrode. The cooling medium is circulated through the hollow space of the electrode. Besides water other liquids, such as salt-solutions, toluol, and the like, may be employed as cooling means.

It is an esential feature of my invention that the cooling medium comes in direct contact with the electrode surfaces to be cooled. And it is further essential that the cooling in question be combined with a specific electrode pressure which is below the crushing limit of the zinc, and in order to prevent a crushing of the zinc there may be provided supporting members 4 and 4' (Fig. 2). This prevents sputtering of the seam being welded. The necessary cooling of the electrode surfaces is further facilitated by reason of the smaller amount of current passing through the seam in consequence of the smaller pressure.

Having now described my invention, what I desire to secure by a patent of the United States is:

1. The method of electrically welding sheet zinc lap seams, consisting in conducting the current to only one of the cutting edges at the lap, and in subjecting only one edge to the pressure of the electrode, substantially as described.

2. The method of electrically welding sheet zinc lap seams, consisting in conducting the current to only one of the cutting edges at the lap, and in subjecting only one edge to the pressure of the electrode; the breadth of the lap being such that the cleaving effect of that one edge upon the layer of oxid covering the lap extends over the whole breadth of the latter, substantially as described.

3. The method of electrically welding sheet zinc lap seams, consisting in conducting the current to only one of the cutting edges at the lap, cooling the welding electrode, and subjecting only one edge to the pressure of the electrode, substantially as described.

4. The method of electrically welding sheet zinc lap seams, consisting in conducting the current to only one of the cutting edges at the lap, cooling the welding electrode by immediate contact with the cooling medium, and subjecting only one edge to the pressure of the electrode, substantially as described.

5. The method of electrically welding sheet zinc lap seams, consisting in conducting the current to only one of the cutting edges at the lap, cooling the welding electrode to a temperature below the fusing point of the zinc so that this latter is prevented from adhering to the electrode, and subjecting only one edge to the electrode pressure, substantially as described.

6. The method of electrically welding sheet zinc lap seams, consisting in conducting the current to only one of the cutting edges at the lap, and in subjecting only one edge to the pressure of the electrode; the specific electrode pressure being so determined as to be below the crushing limit of the zinc, substantially as described.

7. The method of electrically welding sheet zinc lap seams, consisting in conducting the current to only one of the cutting edges at the lap, cooling the welding electrode to a temperature below the fusing point of the zinc so that this latter is prevented from adhering to the electrode, and subjecting only one edge to the electrode pressure, the specific electrode pressure being so determined as to be below the crushing limit of the zinc, substantially as described.

In witness whereof I have hereunto signed my name this twenty-fifth day of October, 1916, in the presence of two subscribing witnesses.

EDMUND SCHRÖDER.

Witnesses:
HENRY HASPER,
ALLEN F. JENNINGS.